US005085785A

United States Patent [19]

Reeves

[11] Patent Number: 5,085,785

[45] Date of Patent: Feb. 4, 1992

[54] PROCESS FOR PURIFYING PSYLLIUM HUSK USING LIQUID FLUORINATED HYDROCARBONS WITH DIFFERENT DENSITIES AS SEPARATION MEANS

[75] Inventor: Allan T. Reeves, Cincinnati, Ohio

[73] Assignee: The Procter & Gamble Company, Cincinnati, Ohio

[21] Appl. No.: 676,685

[22] Filed: Mar. 28, 1991

[51] Int. Cl.[5] .......................... B03D 1/00; C02F 1/24

[52] U.S. Cl. .......................... 210/767; 209/3; 209/172; 210/703; 210/776; 241/9; 241/20

[58] Field of Search .......................... 210/703, 776, 767; 426/479, 481, 482, 429, 430, 442; 209/172, 172.5, 173, 2, 3, 4; 241/9, 20

[56] References Cited

U.S. PATENT DOCUMENTS

| | | | |
|---|---|---|---|
| 3,322,271 | 5/1967 | Edwards | 209/172 |
| 3,348,675 | 10/1967 | Tveter | 209/172 |
| 3,828,017 | 8/1974 | Finley et al. | 426/479 |
| 4,059,604 | 11/1977 | Kresse | 210/703 |
| 4,178,231 | 12/1979 | Smith et al. | 209/172 |
| 4,775,464 | 10/1988 | Ferrara et al. | 209/172 |
| 4,813,613 | 3/1989 | Salete | 426/482 |
| 4,911,889 | 3/1990 | Leland et al. | 422/26 |
| 5,020,732 | 6/1991 | Bahrani | 241/7 |

OTHER PUBLICATIONS

D. Gopani, "Isubgol Cultivation in India", edited hy Ravi Varma, Farm Bulleting, pp. 1-18, Farm Information Unit, Directorate of Extension, Ministry of Food, Agriculture, Community Development and Cooperation, New Delhi, India (1969).

Anderson et al., Hypocholesterolemic Effects of Psyllium Mucilloid for Hypercholesterolemic Men, Federation Proceedings, 46(3), p. 877 (1987).

Anderson et al., Dietary Fiber: Hyperlipidemia, Hypertension and Coronary Heart Disease, American Journal of Gastroenterology, 81, pp. 907-919 (1986).

Fagerbert, The Effects of a Bulk Laxative (Metamucil®) on Fasting Blood Glucose Serum Lipids and Other Variables in Constipated Patients with Non-insulin Dependent Adult Diabetes, Current Therapeutic Research, vol. 31, (2), pp. 166-172 (1982) (Feb.).

1990 USP XXII, NF XVII. The Unites States Pharmacopeia, The National Formulary, United States Pharmacopeial Convention, Inc. (copyright 1989), pp. 1188-1189.

Sampson, "Allergic Reactions to Psyllium", The Role of Psyllium in a Healthy Diet, Colloquium Proceedings, Aug. 24, 1990, Oak Brook, Illinois, pp. 20-27.

*Primary Examiner*—Robert A. Dawson
*Assistant Examiner*—Sun Uk Kim
*Attorney, Agent, or Firm*—Kim William Zerby; Douglas C. Mohl; Richard C. Witte

[57] ABSTRACT

The present invention relates to processes for purifying impure psyllium husk using fluorinated hydrocarbons and the psyllium husk having greater than about 99% purity prepared by these processes.

17 Claims, No Drawings

PROCESS FOR PURIFYING PSYLLIUM HUSK USING LIQUID FLUORINATED HYDROCARBONS WITH DIFFERENT DENSITIES AS SEPARATION MEANS

BACKGROUND OF THE INVENTION

The present invention relates to processes for purifying impure psyllium husk using fluorinated hydrocarbons. The present invention also relates to psyllium husk having greater than about 99% purity prepared by a process of the present invention.

Products containing psyllium seed husk are used in high fiber food products and/or health care products for the benefit of normalizing bowel function and laxations. In addition, research has demonstrated the effectiveness of psyllium seed husk fiber in reducing human serum cholesterol levels, and in controlling blood glucose levels in diabetics. See, for example, J. W. Anderson, et al, *Fed. Proc.*, 46, 877 (1987); J. W. Anderson, et al, *Am. J. Gastroenterology*, 81, 907–919 (1986); and S. Faberberg, *Curr. Ther. Res.*, 31, 166 (1982); all incorporated here and by reference in their entirety.

Psyllium seed husk is typically manufactured by separating the seed husk from the remainder of the seed by slight mechanical pressure, for example by crushing the seeds between rotating plates or rollers. The husk is then typically purified by sieving the mixture to separate the husk from the remainder of the seed parts and/or by blowing (winnowing) the husk away from the impurities. Impurities present in the psyllium husk are predominately sand and dark particles which are readily visually apparent amongst the blond-colored psyllium husks; and these are readily perceived as being particularly gritty during ingestion. Subsequent attempts at purifying the psyllium husk further, for example by sieving and/or gravity tables, are generally tedious processes which produce low yields of psyllium husk and/or only moderately improved purity.

It has been discovered that purification of impure psyllium husks can be achieved easily and efficiently by using liquid fluorinated hydrocarbons having a density within a range suitable for differentiating and separating psyllium husk from more dense and/or less dense impurities present in the husk. By the present invention process, psyllium husk having high purity can be obtained with very little loss in yield of the psyllium husk. Furthermore, psyllium husk prepared by this process which is greater than about 99% pure has also demonstrated significantly reduced allergenicity.

It is therefore an object of the present invention to provide processes for the fast, efficient and safe purification of impure psyllium husk. It is also an object to provide high purity psyllium husk having reduced allergenicity.

These and other objects of the present invention will become readily apparent from the detailed description which follows.

All percentages and ratios used herein are by weight, and all measurements are made at 25° C., unless otherwise specified.

SUMMARY OF THE INVENTION

The present invention relates to processes for purifying impure psyllium husk using fluorinated hydrocarbon. These processes comprise the steps of:

(a) combining impure psyllium husk with liquid fluorinated hydrocarbon having a density whereby the psyllium husk is differentiated from at least a portion of the impurities;

(b) separating the psyllium husk having increased purity from the impurity differentiated by step (a);

(c) optionally repeating one or more times steps (a) and (b) at a different density to differentiate and separate remaining impurities from the psyllium husk; and (d) collecting the psyllium husk having improved purity.

The present invention also relates to psyllium husk having greater than 99% purity prepared by a process of the present invention.

DETAILED DESCRIPTION OF THE INVENTION

The processes of the present invention relate to methods for purifying psyllium husk using liquid fluorinated hydrocarbon which is able to differentiate psyllium husk from impurities based on density. These processes comprise the steps of:

(a) combining impure psyllium husk with liquid fluorinated hydrocarbon having a density whereby the psyllium husk is differentiated from at least a portion of the impurities;

(b) separating the psyllium husk having increased purity from the impurity differentiated by step (a);

(c) optionally repeating one or more times steps (a) and (b) at a different density to differentiate and separate remaining impurities; and (d) collecting the psyllium husk having improved purity.

The materials and processes useful for this process of the present invention are described and exemplified hereinafter.

The seed husk to be purified by the process of the present invention is psyllium seed husk from psyllium seeds, from plants of the *Plantago* genus. Various species such as *Plantago lanceolate, P. rugelii* and *P. major* are known. Commercial psyllium seed husk includes the French (black; *Plantago indica*), Spanish (*P. psyllium*) and Indian (blonde; *P. ovata*). Indian (blonde) psyllium seed husk is preferred for use herein.

Impure psyllium seed husk which may be purified by the processes herein includes raw psyllium seed husk (i.e. the husk obtained by separating the seed husk from the remainder of the seed by slight mechanical pressure), and psyllium seed husk which has been processed to reduce particle size. Preferred psyllium husk to be purified according to the present invention is impure raw psyllium seed husk. Psyllium seed husk has a density typically in the range of about 1.50 to about 1.55 g/ml.

Impurity present in the impure psyllium seed husk is any non-husk material, typically non-husk psyllium seed particles and sand. Furthermore, impurities include the particularly objectionable dark colored impurities present in impure psyllium seed husk. It is desirable to remove non-husk psyllium seed particle impurities, especially the dark colored impurities, by the processes of the present invention.

The purity of impure psyllium seed husk may be readily quantitatively determined by the USP method for measuring psyllium seed husk light and heavy components as described in 1990 *USP XXII, NF XVII, The United States Pharmacopeia, The National Formulary,* United States Pharmacopeial Convention, Inc. (copyright 1989), pages 1188-1189, incorporated by reference herein in its entirety. By this USP method, carbon tetrachloride (density approximately 1.59 g/ml) is used to remove heavy component impurities from the lighter psyllium husk which floats on this solvent; and a 2:1 mixture of carbon tetrachloride/dichloroethane (density approximately 1.45 g/ml) is used to remove light component impurities from the psyllium husk which does not float on this solvent system. Visual inspection of the amount of dark materials present in the psyllium husk is an easy qualitative measure of purity. Impure psyllium seed husk for use in the present processes typically is less than about 99% pure, more typically less than about 98% pure, and most typically about 95% or less pure.

The term "fluorinated hydrocarbon", as used herein, means fluorinated hydrocarbons in liquid form having density within the range useful for differentiating psyllium husk from at least a portion of the impurities typically present in impure psyllium husk. Such fluorinated hydrocarbon materials may be pure compounds or mixtures of compounds. Obviously, the temperature of the fluorinated hydrocarbon at the desired density should not exceed a temperature at which there will be detrimental impact on the psyllium seed husk being purified. However, it is to be recognized (as will be described and illustrated more fully hereinafter) that the temperature and/or pressure of the fluorinated hydrocarbon may be selected, or even varied during the process, to provide the desired density for the fluorinated hydrocarbon being utilized so as to optimize the ability of the fluorinated hydrocarbon to differentiate the psyllium husk from impurities—thereby increasing the efficiency of the process by removing higher amounts of impurity without also losing psyllium seed husk yield.

Preferred fluorinated hydrocarbons are those which have a liquid density within the range of from about 1.4 g/ml to about 1.7 g/ml, and more preferably within the range of from about 1.45 g/ml to about 1.60 g/ml. More preferred are: (1) fluorinated hydrocarbons which have a density within the range of from about 1.4 g/ml to about 1.5 g/ml, preferably within the range from about 1.42 g/ml to about 1.48 g/ml, which are useful for differentiating and separating psyllium seed husk from the typical "light" impurities (generally non-husk seed parts) found in impure psyllium seed husk; and (2) fluorinated hydrocarbons which have a density within the range of from about 1.55 g/ml to about 1.7 g/ml, preferably within the range of from about 1.56 g/ml to about 1.62 g/ml, which are useful for differentiating and separating psyllium seed husk from the typical "heavy" impurities found in impure psyllium seed husk.

Examples of fluorinated hydrocarbons useful herein include trichlorofluoromethane (Freon® 11, sold by DuPont), dichlorodifluoromethane (Freon® 12, sold by DuPont), 1,2-dichloro-1, 1, 2, 2-tetrafluoroethane (Freon® 114, sold by DuPont), chloropentafluoroethane (Freon® 115, sold by DuPont), octafluorocyclobutane (Freon® C318, sold by DuPont), tetrafluoroethane (Freon® 134a, sold by DuPont), and mixtures thereof. Preferred are trichlorofluoromethane, tetrafluoroethane, octafluorocyclobutane, and mixtures thereof.

The process of the present invention allows for flexibility in designing the system to be utilized. The choice of the specific fluorinated hydrocarbon and processing procedures depend on such considerations as the amount of psyllium husk to be processed, the speed desired for the system, type of equipment available or desired to be utilized, the particular fluorinated hydrocarbon(s) desired to be used, and other such process design considerations which are readily apparent to one skilled in the art implementing the present invention processes. Variations in system designs include, but are not limited to: (1) systems whereby fluorinated hydrocarbon having a density variable by temperature and/or pressure over the desired range is used to differentiate and separate both heavy and light impurities from the psyllium seed husk; (2) systems whereby one fluorinated hydrocarbon is used for differentiating and separating the light impurities and a different fluorinated hydrocarbon is used for differentiating and separating the heavy impurities; and (3) a system whereby one fluorinated hydrocarbon is used to differentiate and separate light or heavy impurities, and then another fluorinated hydrocarbon is added to this first fluorinated hydrocarbon to vary the density of the fluorinated hydrocarbon to differentiate and separate remaining impurities. It is preferred, especially for separating light impurities, that the system provide a means for slightly agitating the psyllium husk.

The following example further describes and demonstrates an embodiment within the scope of the present invention. This example is given solely for the purpose of illustration and is not to be construed as a limitation of the present invention as many variations thereof are possible without departing from the spirit and scope.

EXAMPLE

One kilogram of raw psyllium husk (ethylene oxide sanitized; approximately 95% pure) is mixed with approximately 6 kg of Freon® 11 (trichlorofluoromethane; sold by DuPont) in a beaker and the temperature adjusted to just below the boiling point (75° F.; 24° C.) of the Freon® (density approximately 1.45-1.50 g/ml). The psyllium husk sinks to the bottom of the beaker and the impurity which floats on the Freon® 11 is removed by skimming. The Freon® 11 is then cooled to approximately 50° F. (10° C.; density approximately 1.6 g/ml) at which temperature the psyllium husk floats on top of the Freon® 11 and the heavy impurities remain on the bottom of the beaker. The purified husk is collected by skimming from the top of the Freon® 11. The remaining Freon® 11 is evaporated from the psyllium husk to obtain approximately 0.94 kg (about 98% yield) of greater than 99% pure psyllium husk. Testing of the allergenicity of this purified husk indicates that it is significantly less allergenic than the 95% psyllium husk starting material.

What is claimed is:

1. A process for purifying impure psyllium husk comprising the steps of:

(a) combining impure psyllium husk with liquid fluorinated hydrocarbon having a density whereby the psyllium husk is differentiated from at least a portion of the impurities;

(b) separating the psyllium husk having increased purity from the impurity differentiated by step (a);

(c) optionally repeating one or more times steps (a) and (b) at a different density to differentiate and separate remaining impurities from the psyllium husk; and (d) collecting the psyllium husk having improved purity.

2. The process for purifying impure psyllium husk according to claim 1 wherein the fluorinated hydrocarbon is selected from the group consisting of trichlorofluoromethane, dichlorodifluoromethane, 1,2-dichloro-1, 1, 2, 2-tetrafluoroethane, chloropentafluoroethane, octafluorocyclobutane, tetrafluoroethane, and mixtures thereof.

3. The process according to claim 1 comprising the steps of:

(a) combining impure psyllium husk with liquid fluorinated hydrocarbon having a density of less than about 1.5 g/ml to differentiate light impurities from the psyllium husk;

(b) separating the psyllium husk from the differentiated light impurities; and (c) collecting the psyllium husk having improved purity.

4. The process according to claim 1 comprising the steps of:

(a) combining impure psyllium husk with liquid fluorinated hydrocarbon having a density of less than about 1.50 g/ml to differentiate light impurity from the psyllium husk;

(b) separating the psyllium husk from the differentiated light impurities;

(c) combining impure psyllium husk from step (b) with liquid fluorinated hydrocarbon having a density of greater than about 1.55 g/ml to differentiate heavy impurities from the psyllium husk;

(d) separating the psyllium husk from the differentiated heavy impurities; and (e) collecting the psyllium husk having improved purity.

5. The process according to claim 4 wherein the density of the fluorinated hydrocarbon in step (a) is within the range of from about 1.4 g/ml to about 1.5 g/ml; and the density of the fluorinated hydrocarbon in step (c) is within the range of from about 1.55 g/ml to about 1.7 g/ml.

6. The process according to claim 4 wherein the fluorinated hydrocarbon utilized in step (a) and step (c) comprises at least one fluorinated hydrocarbon which is the same in each step.

7. The process according to claim 6 wherein the same fluorinated hydrocarbon is utilized in steps (a) and (c) by changing the density of this fluorinated hydrocarbon by changing the temperature, pressure, or temperature and pressure of the fluorinated hydrocarbon.

8. The process according to claim 7 wherein the fluorinated hydrocarbon is selected from the group consisting of trichlorofluoromethane, tetrafluoroethane, octafluorocyclobutane, and mixtures thereof.

9. The process according to claim 1 comprising the steps of:

(a) combining impure psyllium husk with liquid fluorinated hydrocarbon having a density of greater than about 1.55 g/ml to differentiate heavy impurities from the psyllium husk;

(b) separating the psyllium husk from the differentiated heavy impurities;

(c) combining impure psyllium husk from step (b) with liquid fluorinated hydrocarbon having a density of less than about 1.50 g/ml to differentiate light impurities from the psyllium husk;

(d) separating the psyllium husk from the differentiated light impurities; and (e) collecting the psyllium husk having improved purity.

10. The process according to claim 9 wherein the density of the fluorinated hydrocarbon in step (a) is within the range of from about 1.55 g/ml to about 1.7 g/ml; and the density of the fluorinated hydrocarbon in step (c) is within the range of from about 1.4 g/ml to about 1.5 g/ml.

11. The process according to claim 9 wherein the fluorinated hydrocarbon utilized in step (a) and step (c) comprises at least one fluorinated hydrocarbon which is the same in each step.

12. The process according to claim 11 wherein the same fluorinated hydrocarbon is utilized in steps (a) and (c) by changing the density of this fluorinated hydrocarbon by changing the temperature, pressure, or temperature and pressure of the fluorinated hydrocarbon.

13. The process according to claim 12 wherein the fluorinated hydrocarbon is selected from the group consisting of trichlorofluoromethane, tetrafluoroethane, octafluorocyclobutane, and mixtures thereof.

14. A process for purifying impure psyllium husk comprising the steps of:

(a) combining impure psyllium husk with liquid fluorinated hydrocarbon having a density whereby the psyllium husk is differentiated from at least a portion of the impurities;

(b) separating the psyllium husk having increased purity from the impurity differentiated by step (a);

(c) changing the density of the liquid fluorinated hydrocarbon used in step (a) by changing its temperature, pressure, or temperature and pressure;

(d) combining the psyllium husk from step (b) with the fluorinated hydrocarbon according to step (c) to differentiate remaining impurities from the psyllium husk;

(e) separating the psyllium husk having increased purity from the impurity differentiated by step (d); and (f) collecting the psyllium husk having improved purity.

15. The process according to claim 14 wherein the psyllium husk remains in the fluorinated hydrocarbon while the density of the fluorinated hydrocarbon is changed during step (c).

16. The process according to claim 15 comprising the steps of:

(a) combining impure psyllium husk with liquid fluorinated hydrocarbon having a density of less than about 1.50 such that light impurities float on the fluorinated hydrocarbon and the psyllium husk does not;

(b) removing the light impurities from the top of the fluorinated hydrocarbon;

(c) changing the density of the fluorinated hydrocarbon following step (b), by changing the temperature, pressure, or temperature and pressure, to a density of greater than about 1.55 g/ml such that the psyllium husk floats on the fluorinated hydrocarbon and the heavy impurities do not;

(d) removing the psyllium husk from the fluorinated hydrocarbon; and (e) collecting the purified psyllium husk by removing the remaining fluorinated hydrocarbon.

17. The process according to claim 16 wherein the fluorinated hydrocarbon is trichlorofluoromethane.

* * * * *